United States Patent

Lovorn et al.

(10) Patent No.: US 9,863,453 B2
(45) Date of Patent: Jan. 9, 2018

(54) MECHANICAL SEED COUPLING

(71) Applicants: Mitsubishi Polycrystalline Silicon America Corporation (MIPSA), Theodore, AL (US); MITSUBISHI MATERIALS CORPORATION, Tokyo (JP)

(72) Inventors: Joseph Lovorn, Theodore, AL (US); Larry Gurley, Theodore, AL (US)

(73) Assignees: Mitsubishi Polycrystalline Silicon America Corporation (MIPSA), Theodore, AL (US); MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 13/838,392

(22) Filed: Mar. 15, 2013

(65) Prior Publication Data
US 2014/0270933 A1 Sep. 18, 2014

(51) Int. Cl.
*F16B 7/04* (2006.01)
*B28D 5/02* (2006.01)

(52) U.S. Cl.
CPC ........... *F16B 7/0426* (2013.01); *B28D 5/021* (2013.01); *Y10T 403/5733* (2015.01); *Y10T 403/7039* (2015.01); *Y10T 403/74* (2015.01)

(58) Field of Classification Search
CPC ........ F16B 7/02; F16B 7/0406; F16B 7/0426; F16B 7/048; F16B 7/0486
USPC .... 403/286, 305, 409.1, 361, 389, 391, 404; 464/183
See application file for complete search history.

(56) References Cited

U.S. PATENT DOCUMENTS

| | | | | |
|---|---|---|---|---|
| 1,806,687 A * | 5/1931 | Hoover | ................. | F16B 7/0426 403/312 |
| 2,122,757 A * | 7/1938 | Scott | ............................. | 285/334 |
| 2,125,552 A * | 8/1938 | Feldhoff | ................. | F16B 7/025 138/89 |
| 3,266,821 A * | 8/1966 | Safford | .......................... | 285/40 |
| 3,498,650 A * | 3/1970 | Strange | ................. | F16B 7/0406 403/373 |
| 4,834,429 A * | 5/1989 | Miller | ................... | F16B 7/0426 403/353 |
| 4,838,831 A * | 6/1989 | Rumberger | ........... | F16B 7/0406 403/338 |
| 5,407,291 A * | 4/1995 | Hazinski | ................. | E04H 15/40 135/125 |

(Continued)

FOREIGN PATENT DOCUMENTS

| | | | |
|---|---|---|---|
| DE | EP 0603856 A1 * | 6/1994 | ............ F16B 7/0426 |
| DE | 102011007126 A1 * | 10/2012 | ................ B60T 5/00 |
| FR | 2558904 A1 * | 8/1985 | ............ F16B 7/0426 |

*Primary Examiner* — Josh Skroupa
(74) *Attorney, Agent, or Firm* — Locke Lord LLP

(57) ABSTRACT

An apparatus and method of manufacturing silicon seed rod in which two silicon seeds are joined into one long silicon seed rod by mechanical coupling. A mechanical seed coupler is a body in having an outer wall, an upper surface with an upper aperture, a lower surface with a lower aperture, and an inner wall surrounding an inner space. The mechanical seed couple can be of a shape including a cylinder shape, an elliptical tube shape, a rectangular tube shape and a square tube shape. Furthermore the mechanical seed coupler can be of unitary construction, made from one solid piece of material, or it can be composed of subparts.

7 Claims, 6 Drawing Sheets

(56) References Cited

U.S. PATENT DOCUMENTS

| | | | | |
|---|---|---|---|---|
| 5,411,347 | A * | 5/1995 | Bowmer et al. | 403/305 |
| 5,689,871 | A * | 11/1997 | Carstensen | 29/401.1 |
| 5,888,293 | A * | 3/1999 | Fujiyama et al. | 117/13 |
| 6,015,461 | A * | 1/2000 | Izumi | 117/218 |
| 6,183,556 | B1 * | 2/2001 | Aydelott et al. | 117/218 |
| 6,363,598 | B1 * | 4/2002 | Staudt et al. | 285/333 |
| 6,880,224 | B2 * | 4/2005 | Colarusso et al. | 403/305 |
| 7,438,329 | B2 * | 10/2008 | DeLange et al. | 285/333 |
| 7,455,731 | B2 * | 11/2008 | Nakano et al. | 117/208 |
| 7,621,323 | B2 * | 11/2009 | Reavis et al. | 166/242.1 |
| 7,669,294 | B2 * | 3/2010 | Campbell | F16G 11/00 24/122.3 |
| 8,979,211 | B2 * | 3/2015 | Marshall et al. | 403/305 |

* cited by examiner

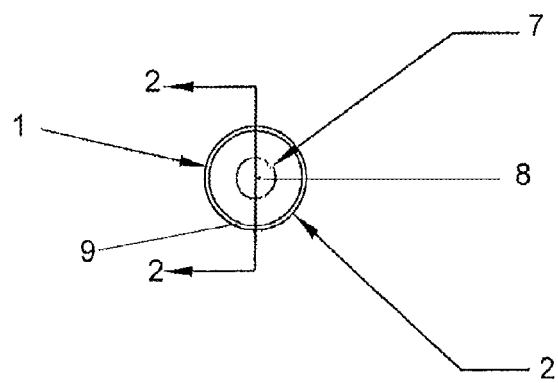
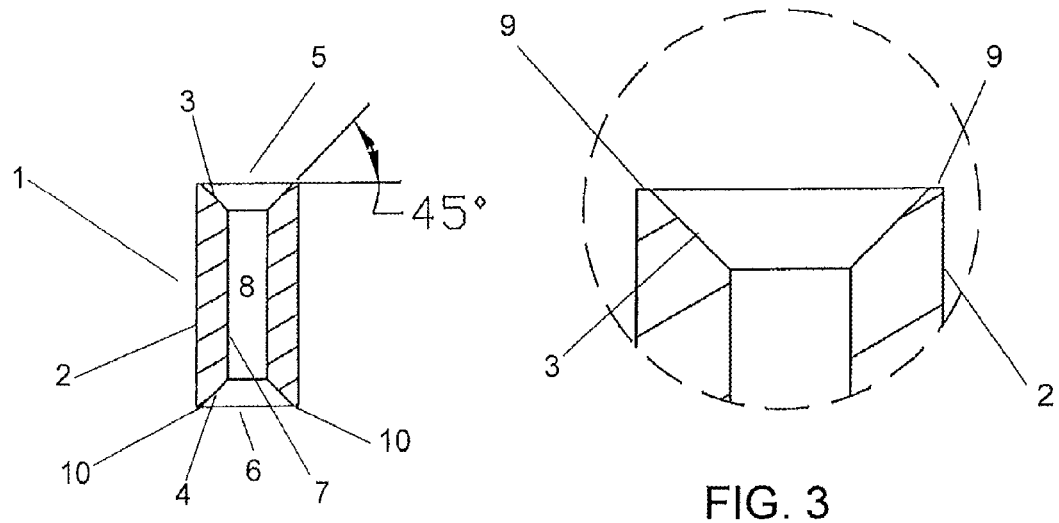
FIG. 1
FIG. 2
FIG. 3

MECHANICAL SEED COUPLING

BACKGROUND OF THE INVENTION

Field of the Invention

The present invention relates to an apparatus and method of manufacturing silicon seed rod in which two silicon seeds are joined into one long silicon seed rod by mechanical coupling.

Description of Related Art

As a polycrystalline silicon producing method, a method of producing by the Siemens method has been known. According to this producing method by the Siemens method; a plurality of silicon seed rods are provided in a reactor and heated, raw material gas including chlorosilane gas and hydrogen gas is supplied to the reactor to bring the raw material gas into contact with the heated silicon seed rods, and polycrystalline silicon is deposited on the surfaces of the silicon seed rods by heat decomposition and hydrogen reduction of the raw material gas as columnar-shaped silicon rods. In this case, the silicon seed rods fixed upright on electrodes mounted on a bottom plate portion of the reactor. Every two silicon seed rods are paired and the upper end portions thereof are connected to each other by a short connecting rod or bridge so that they are formed in a H-shape.

In the producing method of polycrystalline silicon by the Siemens method, the silicon seed rods are manufactured by cutting manufactured silicon rods into silicon seed rods. Since the upper parts of the silicon rods, which are connected by the connecting rods, are cut off when separating in order to be taken out from the reactor, the silicon seed rods are shorter than the original silicon seed rods. There is about 100 mm of length of seed rod lost every time a rod is harvested. This 100 mm comes from the approximately 60 mm of seed rod in the electrode and 40 mm of seed rod above the electrode which is removed because of carbon contamination. Therefore, since the silicon seed rods are getting shorter every manufacturing and cutting out, it is necessary to manufacture new silicon seed rods from silicon rods or to make silicon seed rods from existing long silicon seed rods, periodically. Long silicon seed rod can be produced, for example, by joining short silicon seed rods as described in Japanese Unexamined Patent Application, First Publication No. S63-242339.

Japanese Unexamined Patent Application, First Publication No. S63-242339 describes below a welding method for making silicon seed rods. First, two silicon seed rods are inserted in a horizontal heating tube and are fixed in a state in which the rods are abutted. Next, a heating tube is arranged vertically; a preheating ring is heated into glowing state by a high-frequency heating coil disposed in the heating tube; and one of the silicon seed rods is preheated. After preheating the silicon seed rod, the high-frequency heating coil is moved to the abutted portion of the two silicon seed rods so as to heat the abutted portion, so that the abutted portion is melted by further raising the heating output. After that, by decreasing the output of the high-frequency heating coil so as to cool down the abutted portion of the silicon seed rods, the silicon seed rods are welded. This is the standard way in which two shorter seed rods are joined to form one long seed rod. Welding rods together takes considerable time and energy.

SUMMARY OF THE INVENTION

By the method described in Japanese Unexamined Patent Application, First Publication No. S63-242339, since the silicon seed rods are inserted horizontally in the heating tube, the ends thereof are bent down by their own weight, so that it is difficult to align the ends of the silicon seed rods. Further, after heating the silicon seed rods by the preheating ring, it is necessary to move the heating position of the silicon seed rods from the preheating position to the welding position of the silicon seed rods by moving the high-frequency heating coil. Since the transference of the heating position should be operated by the transference of the high-frequency heating coil, it is complicated to control the heated point, the impedance matching with respect to the variation of the heated point, and the like. Moreover, since the silicon seed rods are heated and melted in a state of being in contact with each other, the melting is not sufficient at the contact surface, so that the welding is defective. As a result, the welding defection parts will be excessively heated when producing polycrystalline silicon.

The present invention is achieved in consideration of the above circumstances, and has an object of providing a coupling device and a method of making silicon seed rods which can be easily controlled so as to be used to manufacture high-quality silicon seed rods.

A coupling device of silicon seed rods according to the present invention is a device in which two silicon seed rods are joined into one silicon seed rod, not by welding, but by a mechanical coupling.

The present invention relates to the above-mentioned polycrystalline silicon seed rod having the structure for coupling silicon seed rods to each other end-to-end, wherein the entire or a part of a peripheral portion, or shoulder portions of the seed rod are removed to leave a central portion and a correspondingly shaped coupling member is inserted between two silicon rods each having a protruding central portion.

The present invention also relates to the above-mentioned polycrystalline silicon seed rod, wherein a peripheral portion in an amount corresponding to 10 to 60% of a diameter of the seed rod end portion, a part of the peripheral portion, or the shoulder portions, are removed to leave a protruding central portion.

The present invention also relates to the above-mentioned polycrystalline silicon seed rod, wherein the protruding central portion has a shape being a disk shape, a column shape, a tapered or angled shape, a square shape, a rectangular shape, irregular variations of the aforementioned shapes or some other shape.

The present invention also relates to the above-mentioned polycrystalline silicon seed rod, wherein a taper is formed on the boundary portion around the protruding central portion.

The present invention also relates to a method of processing the above-mentioned polycrystalline silicon seed rod, wherein both shoulder portions of a rod end portion are removed to leave the of the central protruding portion formed therein.

A polycrystalline silicon rod according to the present invention has a structure for coupling of polycrystalline silicon seed rods to each other end-to-end with a coupling member shaped on each end to correspond to the end of the respective polycrystalline silicon seed rods being coupled together, whereby the coupling member is capable of coupling the seed rods by fitting the coupling member between the seed rods facing to each other. Employment of this coupling structure eliminates a fear that the coupling member easily comes off, and enables engagement of the rods with stably and ease.

Further, the polycrystalline silicon seed rods subjected to the processing of the present invention minimizes the contamination of metals to obtain a high purity single silicon seed rods.

BRIEF DESCRIPTION OF THE DRAWINGS

FIG. 1 is a top plan view showing a mechanical seed coupling of a first embodiment of the present invention, with a bottom plan view being a mirror image;

FIG. 2 is a cross-sectional view showing the mechanical seed coupling as shown in FIG. 1;

FIG. 3 is an exploded cross-sectional view of one end of the mechanical seed coupling shown in FIG. 2;

DETAILED DESCRIPTION OF THE INVENTION

Figure 4:
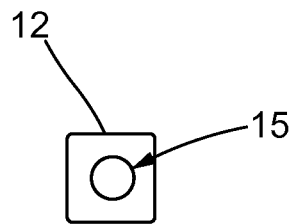
FIG. 4 is a top plan view of a silicon seed rod of a first embodiment of present invention.

Hereinafter, embodiments of a silicon seed rod, a mechanical seed coupling device and a silicon seed rod extension and a mechanical seed rod extension device will be described with reference to the drawings.

A mechanical seed coupler 1, as shown in FIGS. 1 to 3, is a body having an outer wall 2, an upper surface 3 with an upper aperture 5, a lower surface 4 with a lower aperture 6, and an inner wall 7 surrounding an inner space 8. The mechanical seed coupler 1 can have a shape including a cylinder shape, an elliptical tube shape, a rectangular tube shape, a square tube shape, or irregular variations of the aforementioned shapes, among other shapes. The inner space 8 inside the mechanical seed coupler 1 can have a shape including a cylinder shape, an elliptical tube shape, a rectangular tube shape, a square tube shape, or irregular variations of the aforementioned shapes, among other shapes. The upper aperture 5 and the lower aperture 6 can have various shapes depending on the slope, angle or curve of the upper surface 3 and the lower surface 4, respectively. FIGS. 1-3 show the mechanical seed coupler 1 in a cylinder shape. Furthermore the mechanical seed coupler 1 can be of unitary construction, made from one solid piece of material, or it can be composed of subparts bonded or fused together. FIGS. 1-3 show the mechanical seed coupler 1 of unitary construction. The inner space 8 extends from the upper surface 3 to the lower surface 4 to create the continuous inner space 8 inside the mechanical seed coupler 1.

Figure 5:
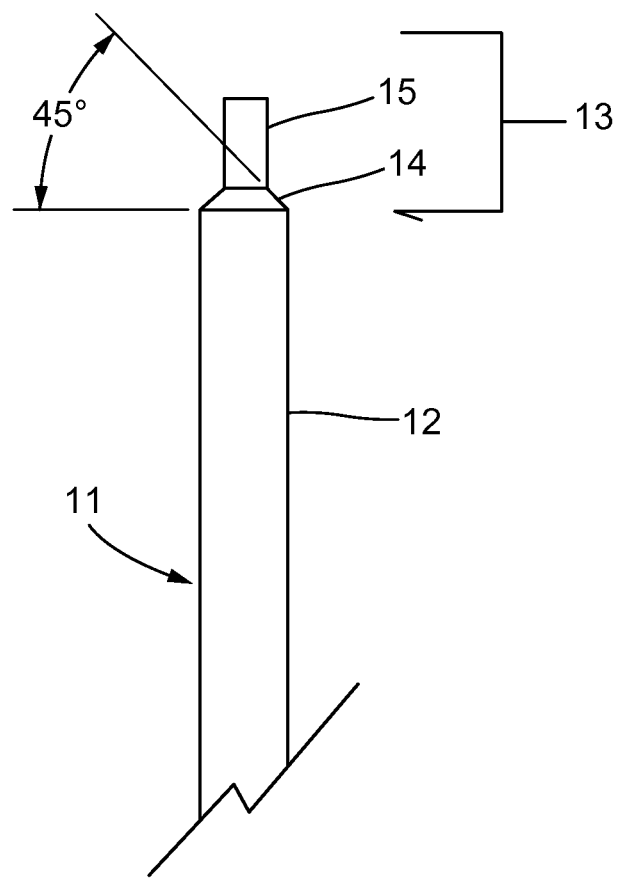
FIG. 5 is a side view of the silicon seed rod of the first embodiment of the present invention.

The outer wall 2 and the inner wall 7 generally have a smooth surface. The upper surface 3 and the lower surface 4 are typically angled or tapered surfaces to match a corresponding angled surface of a seed rod end 14, as shown in FIG. 5. The angle at which the upper surface 3 is disposed is consistent all around the circumference of the mechanical seed coupler 1 to match the seed rod end 14. In the embodiment shown in FIGS. 1-3, between the upper surface 3 and the outer wall 2 is a flat surface 9 perpendicular to the outer wall 2. In the embodiment of FIG. 1, lower surface 4 has the same characteristics and angle as described above for the upper surface 3. Similarly, between the lower surface 4 and the outer wall 2 is a flat surface 10 perpendicular to the outer wall 2.

The angle at which the upper surface 3 and the lower surface 4 is disposed relative to a horizontal surface defined by a top of the mechanical seed coupler 1 can vary in the range of 20° to 80°, but is preferably in the range of 30° to 60° and more preferably in the range of 40° to 50°. In the embodiment shown in FIGS. 2 and 3 the angle at which the upper surface 3 and the lower surface 4 is disposed is 45°.

FIG. 1 shows a top plan view of the mechanical seed coupler 1 of FIG. 2. The view shows, in the direction of inside center to outside surface, the inner space 8 is surrounded by the inner wall 7, a top of the inner wall 7 being circumscribed by the upper surface 3, which is itself circumscribed by the flat surface 9 which is circumscribed by a top part of the outer wall 2.

Angled surfaces 3 and 4 are shown at a 45° angle relative to a horizontal surface defined by a top of the mechanical seed coupler 1 in FIGS. 2-3. The angled surfaces 3 and 4 create the upper aperture 5 and the lower aperture 6 respectively. This is also more clearly shown in the exploded view of FIG. 3. FIG. 3 shows the flat surface 9 between the angled surface 3 and the outer wall 2.

The purpose of the angled surfaces 3 and 4 is to securely hold or physically contact a corresponding angled surface at an end of a silicon seed rod 11, show in FIGS. 4-5. FIG. 5 shows the end of the silicon seed rod 11 having a rod body 12 and a tip end 13. The tip end 13 has an angled surface 14 extending from an outside surface of the rod body 12 to a base of a tip 15 which is narrower in diameter than the rod body 12.

The silicon seed rod 11 having the tip end 13 which corresponds to the shape of one end of the mechanical seed coupler 1 is inserted into the mechanical seed coupler 1 such that tip 15 is inserted into the upper aperture 5 or the lower aperture 6 and the angled surface 14 physically contacts the upper surface 3 or the lower surface 4, respectively. Preferably the angle at which the angled surface 14 is disposed, relative to a horizontal surface defined by the surface where the angled surface 14 meets the outside surface of the rod body 12, is the same as the angle at which the upper surface 3 is disposed or the lower surface 4 is disposed to ensure that the surface 14 and the surfaces 3 or 4 contact each other along the entire length of both the upper surface 3 or the lower surface 4 and the angled surface 14. For seed rod stability when coupled and for an efficient heat and electrical connection it is important that the surface profile of the seed rod matches the surface profile of the upper surface 3 and the lower surface 4, respectively.

All of the angled surfaces bear the weight of the object contacting the surface from above. In use, the mechanical seed coupler 1 will couple two seed rods 11 together, one seed rod 11 being inserted into each end of the mechanical seed coupler 1 for a contacting fit with the mechanical seed coupler 1. Typically the mechanical seed coupler 1 has a longitudinal length long enough so that when the seed rods 11 are inserted into the mechanical seed coupler 1 the tip 15 of one seed rod 11 does not contact the tip 15 of the opposing seed rod 11. This will ensure that both seed rods 11 are seated properly on the mechanical seed coupler 1 to achieve a good contact fit with the mechanical seed coupler 1. The dimensions of the mechanical seed coupler 1 and the tips 15 of the seed rods 11 could however be made such that tips 15 of opposing seed rods 11 contact each other and at the same time seed rods 11 achieve a secure contact fit with the mechanical seed coupler 1.

After opposing seed rods 11 are coupled with the mechanical seed coupler 1 to create a single seed rod of the proper dimension for use in a reactor to grow silicon rods, the created single silicon seed rod is inserted into a reactor. Inside the reactor a silicon rod will be made from the two silicon seed rods 11 joined by the mechanical seed coupler 1.

Figure 6:
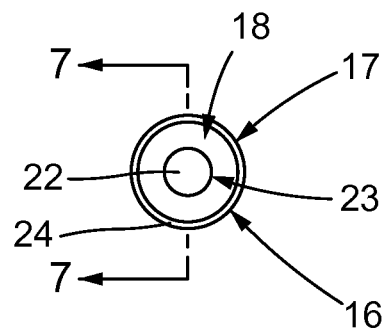
FIG. 6 is a top plan view showing a mechanical seed coupling of a second embodiment of the present invention, with a bottom plan view being a mirror image.
Figure 7:
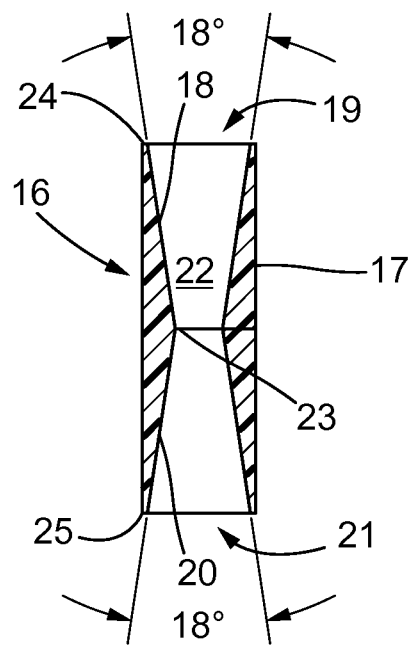
FIG. 7 is a cross-sectional view showing the mechanical seed coupling of the second embodiment as shown in FIG. 6.

FIGS. 6-9 show a second embodiment of the present invention. A mechanical seed coupler 16, as shown in FIGS. 6 and 7, is a body having an outer wall 17, an upper surface 18 with an upper aperture 19, a lower surface 20 with a lower aperture 21, and an inner space 22. The upper surface 18 and the lower surface 20 meet inside inner space 22 at a point 23. The location of the meeting point 23 of the upper surface 18 and the lower surface 20 inside inner space 22 will vary depending on the angle of the upper surface 18 and the lower surface 20.

In the embodiment shown in FIG. 7, the angle of both the upper surface 18 and the lower surface 20 is approximately 18° from an axis line of 0° running through the exact center of the mechanical seed coupler 16. In this case were the angle of the upper surface 18 and the lower surface 20 is equal, the upper surface 18 and the lower surface 20 meet at the midpoint along the inner space 22 along the length of mechanical seed coupler 16. Other possible angles of the upper surface 18 and the lower surface 20 include approximately 14°, 15°, 16°, 17°, 19°, 20°, 21°, and 22°. While typically the angles of the upper surface 18 and the lower surface 20 are equal, the angles can also differ from each other.

The mechanical seed coupler 16 can have a shape including a cylinder shape, an elliptical tube shape, a rectangular tube shape, a square tube shape, or irregular variations of the aforementioned shapes, among other shapes. The inner space 22 inside the mechanical seed coupler 16 has a shape with opposing oppositely angled or tapered surfaces formed along the entire length of an upper portion or an upper half in one direction and a lower portion or a lower half in the opposite direction.

Similar to the mechanical seed coupler 1, the mechanical seed coupler 16 can be of unitary construction, made from one solid piece of material, or it can be composed of subparts bonded or fused together. FIG. 7 shows the mechanical seed coupler 16 of unitary construction.

Figure 9:
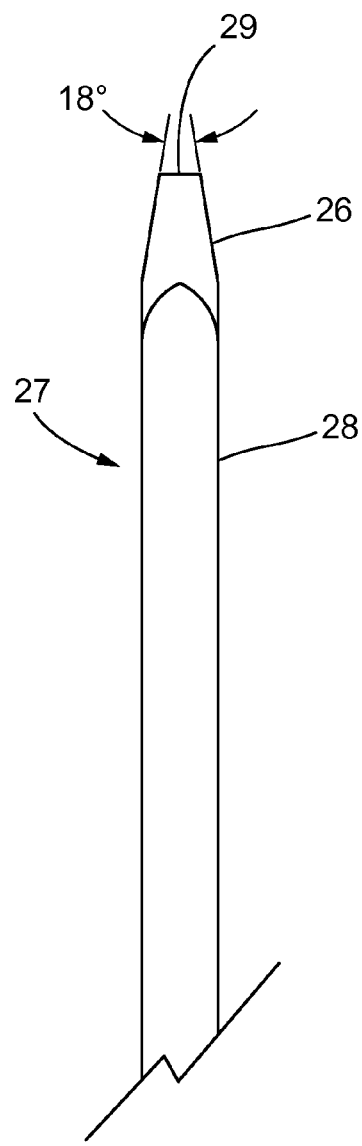
FIG. 9 is a side view of the silicon seed rod of the second embodiment of the present invention.
Figure 10:
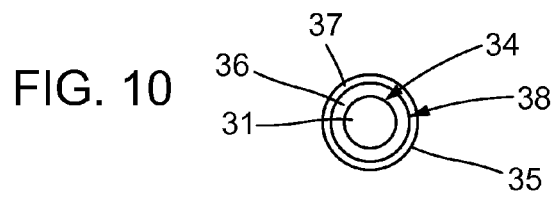
FIG. 10 is a top plan view of a silicon seed rod for seed extension of a third embodiment of present invention.

The outer wall 17 and the inner wall 18 generally have a smooth surface. The upper surface 18 and the lower surface 20 are angled or tapered surfaces to match a corresponding tapered surface of a seed rod end 26, as shown in FIG. 9. In the embodiment shown in FIGS. 6-7, between the upper surface 18 and the outer wall 17 is a flat surface 24 perpendicular to the outer wall 17. In the embodiment of FIG. 7, lower surface 20 has the same characteristics and angle as described above for the upper surface 18. Similarly, between the lower surface 20 and the outer wall 17 is a flat surface 25 perpendicular to the outer wall 17.

FIG. 6 shows a top plan view of the mechanical seed coupler 16 of FIG. 7. The view shows, in the direction of inside center to outside surface, the inner space 22 is surrounded by the upper surface 18, a top of the upper surface 18 being circumscribed by the flat surface 24 which is circumscribed by a top part of the outer wall 17.

Figure 8:
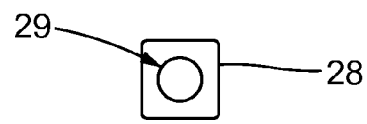
FIG. 8 is a top plan view of a silicon seed rod of a second embodiment of present invention.

The purpose of the angled surfaces 18 and 20 is to securely hold or physically contact a corresponding angled or tapered surface at an end of a silicon seed rod 27, shown in FIGS. 8-9. FIG. 9 shows the end of the silicon seed rod 27 having a rod body 28 and a tip end 29. The tip end 29 has flat surface.

The silicon seed rod 27 having the tapered surface 26 corresponds to the shape of one end of the mechanical seed coupler 16 is inserted into the mechanical seed coupler 16 such that tip 29 is inserted into the upper aperture 19 or the lower aperture 21 and the angled surface 26 physically contacts the upper surface 18 or the lower surface 20, respectively. Preferably the angle at which the angled surface 26 is disposed, relative to a horizontal surface defined by the surface where the angled surface 26 meets the outside surface of the rod body 28, is the same as the angle at which the upper surface 18 is disposed or the lower surface 20 is disposed to ensure that the surface 26 and the surfaces 18 or 20 contact each other along the entire length of both the upper surface 18 or the lower surface 20 and the angled surface 26. For seed rod stability when coupled and for an efficient heat and electrical connection it is important that the surface profile of the seed rod matches the surface profile of the upper surface 18 and the lower surface 20, respectively.

All of the angled surfaces bear the weight of the object contacting the surface from above. In use, the mechanical seed coupler 16 will couple two seed rods 27 together, one seed rod 27 being inserted into each end of the mechanical seed coupler 16 for a contacting fit with the mechanical seed coupler 16. The method of using the mechanical seed coupler 16 is the same as the method of using the mechanical seed coupler 1 described above.

FIGS. 10-15 show a third embodiment of the present invention. Similar reference numbers refer to like parts described above.

Figure 13:
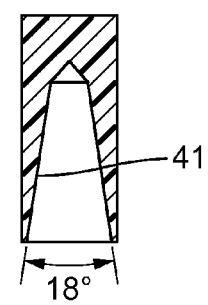
FIG. 13 is a cross-section view of the silicon seed rod for seed extension of the third embodiment of present invention as shown in FIG. 12.
Figure 14:
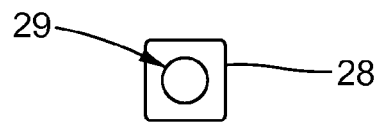
FIG. 14 is a top plan view of a silicon seed rod for seed extension of a third embodiment of present invention.
Figure 15:
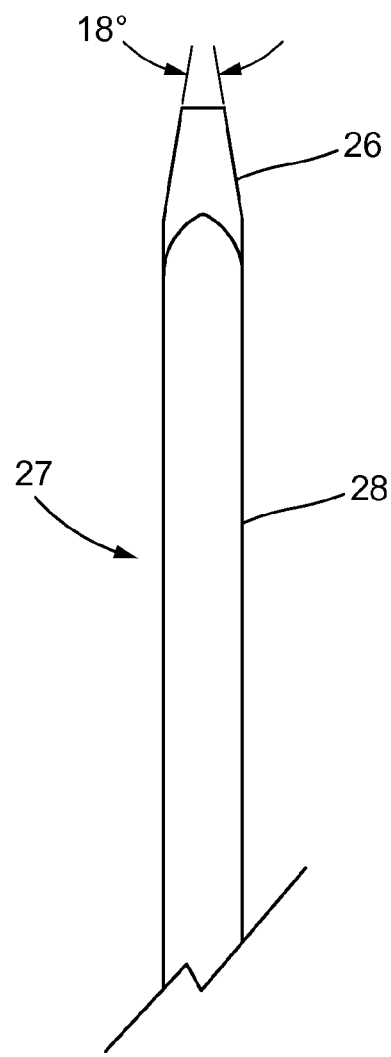
FIG. 15 is a side view of the silicon seed rod for seed extension of the third embodiment of the present invention.

FIGS. 10-13 show a silicon seed rod extension 30 of any desired length with a tip 31 at one end for coupling to a short connecting rod (not shown) which is connected to another silicon seed rod (not shown) so that two silicon seed rods are coupled together in a Π-shape and a mechanical coupler 32 at the opposite end for connecting to a silicon seed rod 27 as shown in FIGS. 14-15. The silicon seed rod extension 30 embodiment allows for flexibility because the opposing ends can be made depending on the coupling shape desired.

Figure 11:
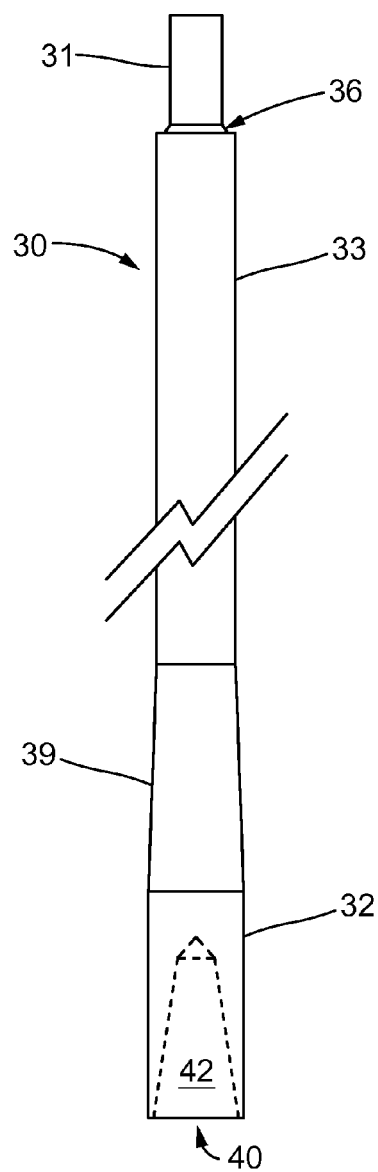
FIG. 11 is a side view of the silicon seed rod for seed extension of the third embodiment of the present invention.

In the embodiment shown in FIG. 11 silicon seed rod extension 30 has extension body 33 and tip 31. End tip 31 is narrower in diameter than extension body 33. Between an outer surface 34 of end tip 31 and the outer surface 35 of the extension body 33 is an angled surface 36 and a shoulder 37. Angled surface 36 and shoulder 37 meet at a point 38.

On the opposite end of the silicon seed rod extension 30 is mechanical coupling 32. Between mechanical coupling 32 and extension body 33 is a transition section 39 having the same diameter as the extension body 33 at the end which directly contacts the extension body 33 and the same diameter as the mechanical coupling 32 at the end which directly contacts the mechanical coupling 32. The transition section 39 can be made of unitary construction with the extension body 33; can be made of unitary construction with the mechanical coupling 32; or can be separate but connected both the extension body 33 and the mechanical coupling 32.

The mechanical coupling 32 is the same as mechanical seed coupling 16 except it only has one aperture 40 and one angled surface 41 as compared to opposing apertures and opposing angle surfaces.

Figure 12:
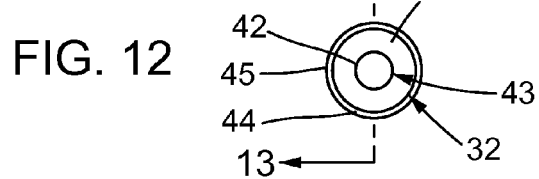
FIG. 12 is a bottom plan view of the silicon seed rod for seed extension of the third embodiment of present invention.

FIG. 12 shows a bottom plan view of the mechanical seed coupler 32 of FIG. 11. The view shows, in the direction of inside center to outside surface, the inner space 42 is surrounded by the upper surface 43, a bottom of the surface 41 being circumscribed by the flat surface 44 which is circumscribed by a top part of the outer wall 45.

The purpose of the angled surfaces 41 and 20 is to securely hold or physically contact a corresponding angled or tapered surface at an end of a silicon seed rod 27, shown in FIGS. 14-15. FIG. 15 shows the end of the silicon seed rod 27 having a rod body 28 and a tip end 29. The tip end 29 has flat surface.

In the embodiment shown in FIG. 13, the angle of both the surface 41 is approximately 18° from an axis line of 0° running through the exact center of the mechanical seed coupler 32. Other possible angles of the surface 41 include approximately 14°, 15°, 16°, 17°, 19°, 20°, 21°, and 22°.

All of the angled surfaces bear the weight of the object contacting the surface from above.

Generally the mechanical seed coupler is made from the same material as the seed rods 11, which is polycrystalline silicon. By using the same material as the seed rods 11, the mechanical seed coupler 1 will have similar properties such as allowing electricity to pass through, not heating unevenly compared with the seed rods, and not creating a different electrical resistance. By using the design of the invention, the problems of differential heating and expansion of the coupler and the seed rods will be minimized or substantially eliminated. Furthermore by using the design of the invention, the mechanical seed coupler 1 will be strong enough to withstand the flow of gasses in the reactor during the early stages of a CVD reaction.

To maintain even heating of the parts and the expansion of the parts, the cross sectional area of the coupler should match that of the seed rod.

The dimensions the mechanical seed coupler 1 can vary depending on the size of the seed rods 11 to be coupled. The mechanical seed coupler can be in the range of 50 to 100 mm in height and in the range of 20 to 40 mm in diameter. Preferably the mechanical seed coupler will be about 65 mm in height and about 30 mm in diameter.

The processing process of the present invention and the seed rod subjected thereto are featured by removing a peripheral portion of the polycrystalline seed rod entirely or partially and subjecting the remaining central portion thereof to processing. More particularly, for example, the peripheral portion of the seed rod end portion is cut round along the peripheral surface to leave a cylindrical projecting or protruding central portion or both shoulder portions of a seed rod end portion is cut off to leave a protruded strip-like central portion.

When a polycrystalline silicon seed rod is produced by the Siemens process, in which trichlorosilane and hydrogen as the raw materials are introduced in a sealed vessel and the raw material gases are contacted with the surface of a silicon seed rod heated to a high temperature by application of electric current to thermally decompose the trichlorosilane, thereby depositing silicon, the central portion of the rod has a temperature higher than that of the surface of the rod, so that there is generated a difference in temperature as large as 100° C. or more. This results in a difference in stress between the central portion and the surface portion, which difference remains in the rod as residual stress after completion of the reaction.

More particularly, always a compression stress is exerted in the circumferential direction in the seed rod, whereas in the radial direction a compression stress is exerted in the central portion of the seed rod but a tensile stress is exerted in the peripheral portion of the seed rod. On the other hand, in the axial direction, a tensile stress is exerted in the central portion of the rod but a compression stress is exerted in the peripheral portion of the seed rod.

Accordingly, in the present invention, making the best of the fact that always a compression stress is exerted in the circumferential direction, the peripheral portion of the seed rod is removed along the circumferential direction to decrease the tensile stress in the radial direction. Alternatively, a part of the peripheral portion of the rod end portion, that is, both shoulder portions of the rod end portion is cut off to decrease the tensile stress in the radial direction. The portion to be removed is suitably a portion corresponding to 10 to 60% of the diameter. The central portion left after the removal of the peripheral portion is mostly in the region where a compression stress is exerted, so that it will not be cracked when it is subjected to processing. The removed portion of less than 10% of the diameter of the rod is not desirable since the portion of tensile stress remains to such an extent that the influence of tensile stress cannot be excluded sufficiently. On the other hand, the removed portion of above 60% is not suitable since the central portion to be further processed is too small.

As, an example of the processing process a diamond wheel (i.e., a cutter provided with a diamond coating on the periphery) is applied to the periphery at an end portion of the polycrystalline silicon seed rod (silicon rod). Then the rod and wheel are rotated in reverse directions to polish the peripheral portion of the seed rod to remove it. The method for removing the peripheral portion is not limited to grinding and other methods, for example, a method of cutting off the portion surrounding the peripheral portion using a diamond saw or the like and then optionally grinding the resultant circumferential surface using a diamond wheel to obtain a smooth surface may be used. The end result is a seed rod having a protruding central portion surrounded by a shoulder which can be flat or tapered at an angle in range of 20° to 80°, but is preferably in the range of 30° to 60° and more preferably in the range of 40° to 50°. In the first embodiment of the present invention the seed rod shoulder is tapered at an angle of 45°.

The mechanical seed coupler can be made efficiently from a disk of polycrystalline silicon. A disk can provide many mechanical seed couplers if processed to avoid wasted material between the mechanical seed couplers. First small holes, which form the inner space 8 of the mechanical seed coupler are bored out in an evenly spaced pattern around the disk. Next an area around the small hole is chamfered on both sides of the disk forming upper surface 3 and the lower surface 4, as shown in FIG. 2. Finally a boring tool is used to bore out around the edge of each chamfered surface a bore which becomes the mechanical seed coupler once it is separated from the disk. The height of the disk can be made to be the same height as the mechanical seed coupler so that no further processing is necessary.

INDUSTRIAL APPLICABILITY

A mechanical seed coupler and polycrystalline silicon rod according to present invention have a structure for coupling of polycrystalline silicon seed rods to each other end-to-end. According to the polycrystalline processing process of the present invention and the polycrystalline silicon rod formed by the processing process, for coupling silicon rods made of polycrystalline silicon to each other can be performed without subjecting the silicon rods to annealing treatment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims. The invention and embodiment are described for illustrative, but not limitative purposes. It is to be understood that changes and/or modifications can be made by those skilled in the art without for this departing from the related scope of protection, as defined by the enclosed claims.

What is claimed is:

1. A mechanical seed coupler for coupling two seed rods comprising:
   a body, consisting of at most three inner surfaces, surrounding a hollow space for accepting tips of two seed rods for coupling, having a tapered, uninterrupted surface on one end of the body and a tapered, uninterrupted surface on the other end of the body, both tapered, uninterrupted surfaces being connected to the hollow space, wherein the each surface is configured for accepting a corresponding tip of the two seed rods having a corresponding surface,
   wherein the body is made from polycrystalline silicon.

2. The mechanical seed coupler for coupling two seed rods of claim 1, wherein the two tapered, uninterrupted surfaces are each disposed at an angle, relative to a horizontal surface defined by a top or bottom of the mechanical seed coupler, respectively, within the range of 30 to 70°.

3. The mechanical seed coupler for coupling two seed rods of claim 1, wherein the two tapered, uninterrupted surfaces are each disposed at a 45° angle, relative to a horizontal surface defined by a top or bottom of the mechanical seed coupler, respectively.

4. The mechanical seed coupler for coupling two seed rods of claim 1, wherein when two seed rod tips are inserted therein the seed rod tips do not contact each other.

5. The mechanical seed coupler for coupling two seed rods of claim 1, wherein the two tapered, uninterrupted surfaces are each disposed at an 18° angle from an axis line of 0° running through the exact center of the mechanical seed coupler.

6. A mechanical seed coupler for coupling two seed rods comprising:
   a body, consisting of at most three inner surfaces, surrounding a hollow space for accepting tips of two seed rods for coupling, having a tapered, uninterrupted surface on one end of the body and a tapered, uninterrupted surface on the other end of the body, both tapered, uninterrupted surfaces being connected to the hollow space, wherein the each surface is configured for accepting a corresponding tip of the two seed rods having a corresponding surface,
   wherein the two tapered, uninterrupted surfaces are each disposed at an angle, from an axis line of 0° running through the exact center of the mechanical seed coupler, respectively, within the range of 14 to 22°, and
   wherein the body is made from polycrystalline silicon.

7. A silicon rod comprising:
   two seed rods;
   a mechanical seed coupler for coupling the two seed rods, the coupler comprising: a body, consisting of at most three inner surfaces, surrounding a hollow space for accepting tips of two seed rods for coupling, having a tapered, uninterrupted surface on one end of the body and a tapered, uninterrupted surface on the other end of the body, both tapered, uninterrupted surfaces being connected to the hollow space, wherein the each surface is configured for accepting a corresponding tip of the two seed rods having a corresponding surface.

* * * * *